United States Patent [19]

Dietrich

[11] Patent Number: 4,553,295

[45] Date of Patent: Nov. 19, 1985

[54] MECHANISM FOR LATHE-WORKING ARTICLES

[75] Inventor: Hermann Dietrich, Ludwigshafen, Fed. Rep. of Germany

[73] Assignee: Ingenieurburo, Hermann Dietrich, Ludwigshafen, Fed. Rep. of Germany

[21] Appl. No.: 602,433

[22] Filed: Apr. 20, 1984

[30] Foreign Application Priority Data

Apr. 23, 1983 [DE] Fed. Rep. of Germany ....... 3314758

[51] Int. Cl.⁴ .............................................. B21D 51/54
[52] U.S. Cl. ....................................................... 29/1.32
[58] Field of Search ................................... 29/1.3–1.32

[56] References Cited

U.S. PATENT DOCUMENTS

| | | | |
|---|---|---|---|
| 1,943,107 | 1/1934 | Candee | 29/1.32 |
| 2,606,359 | 8/1952 | Stadthaus | 29/1.32 |
| 4,423,991 | 1/1984 | Derr | 29/1.32 |

*Primary Examiner*—Howard N. Goldberg
*Assistant Examiner*—Steven Nichols
*Attorney, Agent, or Firm*—Berman, Aisenberg & Platt

[57] ABSTRACT

A mechanism for the lathe-working of longitudinal, cylindrical, or slightly conical work-pieces (88), preferably cartridge cases for firearms, which uses at least two driven rotating spindles (80) located in a housing (17). The housing (17) is rotatable around an axle (16) and is rotated by a hydraulic or pneumatic cylinder (22, 23) into a series of operating positions. Tools for working the cartridge cases (88), (a) a shaper for the extractor groove (93) and the extractor flange (92) and (b) a cut-off piece (103), are both attached to a cut-off sled (101). This cut-off sled (101) is guided back and forth on a main sled (94) laterally with respect to the axis of rotation of a spindle (80). The main sled itself may be moved in the direction of the axis of rotation of the spindle (80). In this manner, the length of the cartridge case is determined exactly. Furthermore, each rotating spindle (80) is driven individually. Through use of a clutch (67), each rotating spindle can be selectively connected to a drive motor. In this way, only one rotating spindle is driven at any particular time while the others are not driven. Thus, the loading time is shortened and the loading process simplified.

14 Claims, 3 Drawing Figures

MECHANISM FOR LATHE-WORKING ARTICLES

FIELD OF THE INVENTION

This invention relates to a mechanism for lathe-working articles, particularly firearm cartridge casings.

BACKGROUND ART

Mechanisms used in lathe-working cartridge casings employ a number of rotating spindles all of which are driven simultaneously by a driving mechanism. Cartridge casings are inserted into the rotating spindles and, after all of the rotating spindles have been filled, the drive motor is energized. Individual cartridge casings are then worked step-by-step by a profiling tool in the area of the casing extractor groove and extraction flange. Then, the cartridge case is cut off and deburred in the area of the case neck. Because all rotating spindles are simultaneously driven in a turret head, the timing intervals are relatively long and, moreover, loading and unloading are relatively complicated.

SUMMARY OF THE INVENTION

The purpose of this invention is to provide a mechanism of the previously-described kind in which the disadvantages of prior mechanisms are avoided. In particular, the loading and unloading processes are greatly simplified and the timing intervals are shortened.

The invention provides a pivotally-mounted housing whose axis of rotation is horizontal. The housing need not perform a full 360 degree rotation, but can instead be moved from a first position into subsequent working positions and back again. Thus, the loading process is considerably simplified. Moreover, the timing intervals are considerably shortened by providing separately controlled article-holding spindles. The movement of the housing is controlled by a pneumatic or hydraulic actuating control mechanism, and stops are provided against which the housing abuts in terminal positions of the swing motion. These stops are preferably cushioned.

The housing is mounted on a shaft which carries a gear wheel driven by a motor. The individual rotating spindles are driven by the gear wheel, with intermediate insertion of additional gear mechanisms. The gear wheel is preferably a toothed gear driven by a flexible belt.

Each of the individual rotating spindles is driven by a separate gear, and a clutch is preferably provided between the drive motor and a rotating spindle. The preferred clutch is an electromagnetic clutch.

The advantage of the invention is that, during the lathe-working of a first work piece, only the rotating spindle for that work piece needs to be driven. The clutches permit the other spindles to be disconnected from the drive motor. The wear of the bearings in the rotating spindles is, accordingly, less. Loading and unloading are considerably simplified because all spindles other than the working one will be stationary.

A first sled supports tools for each end of the cartridge casing and is preferably supported on a second sled. The second sled is preferably U-shaped and a downwardly extending shank includes a longitudinal stop for the work piece.

One particular feature of this design is that when working cartridge cases, one work piece, which forms the extractor groove and the extractor flange, is spaced a fixed distance fom a cutting tool which defines the length of the case. This results because the tools are both mounted on a single sled, the tool holding sled, which in turn can be shifted relative to the main sled in a direction perpendicular to the movement of the main sled. In this manner, an accurate and exact length for a cartridge case is achieved and, moreover, the working time for each individual case is definitely reduced because shaping and cut-off are performed at the same moment.

Further advantageous aspects of the invention will be apparent to those of skill in the art.

DETAILED DESCRIPTION

Figure 1:
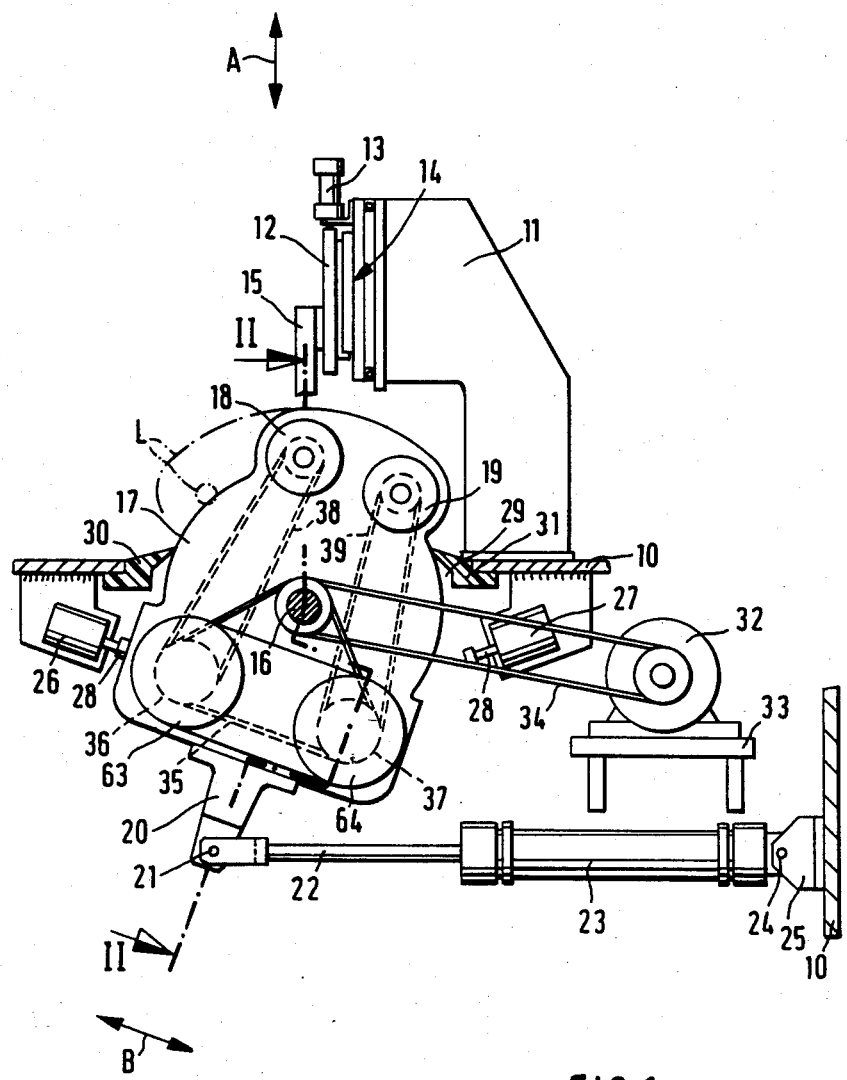
FIG. 1 is a side view of a turning mechanism according to the invention.

The turning mechanism according to the invention has a machine table 10 which is positioned on a machine bed, not illustrated in greater detail. A jib or column 11 is mounted on the table and has, at its free end, a tool sled 12 that can be moved vertically in the direction of double arrow A and which is driven by a hydraulic or pneumatic cylinder 13 attached to the jib 11. Tool sled 12 is guided in a special sled guide 14 which is not described in greater detail because it is within the general state of the art. Attached to the tool sled is a tool holder 15 which carries tools, as described in greater detail below.

Over a central, independent axle 16 a swing housing 17 is positioned; two work-piece holding devices 18 and 19 are arranged on its upper end. These work-piece holding devices are described in greater detail with the help of FIG. 3. The swing housing 17, on the side of the central independent axle 16 opposite the work-piece holding devices 18 and 19, has a prolongation 20 at which, via a joint 21, the piston rod 22 of a hydraulic or pneumatic swing cylinder 23 is articulated. The swing cylinder 23 is articulated at its opposite end on a joint axle 24 by a fork-shaped mounting 25. As the swing cylinder 23 is activated, the swing housing 17 is swung in the direction of arrow B around the central swing axle 16. The deflections are limited by adjustable stops 26 or 27, which in each case are preferably equipped with a cushion. For adjustment purposes, each swing stop 26 or 27 has an adjusting screw 28. Both stops 26 and 27 are firmly welded onto the machine table and are below the machine table and also below the swing axle 16. Swing axle 16 is likewise underneath the plane determined by machine table 10, and swing housing 17 protrudes through an opening 29 in the machine table whereby the interval between the limiting edges of the opening 29 and the outside surface of swing housing can be sealed against dropping chips by means of elastic seals 30 and 31.

Cartridge cases are inserted into both work-piece holding devices 18 and 19 and worked. The cartridge case in the work-piece holding device 18 is worked first, and then the case in work-piece holding device 19 is worked. The drawing merely shows two work-piece holding devices; it is possible to enlarge the housing and to provide three or more holding devices as indicated by lines at L.

A drive motor 32 drives the work-piece holding devices 18 and 19 and is preferably an electric motor which is positioned on a motor stand 33. The drive energy from motor 32 is transmitted to the central swing shaft or the central swing axle 16 by means of a first toothed gear belt 34. Naturally, one could also provide a chain drive or a V-belt. The swing axle now, via a second toothed gear belt 35, drives two toothed wheels 36 and 37 which are arranged at an interval with respect to each other and which in turn once again, via a third or forth toothed gear belt 38 or 39, drive the two work-piece holding devices 18 or 19 in rotation.

Figure 2:
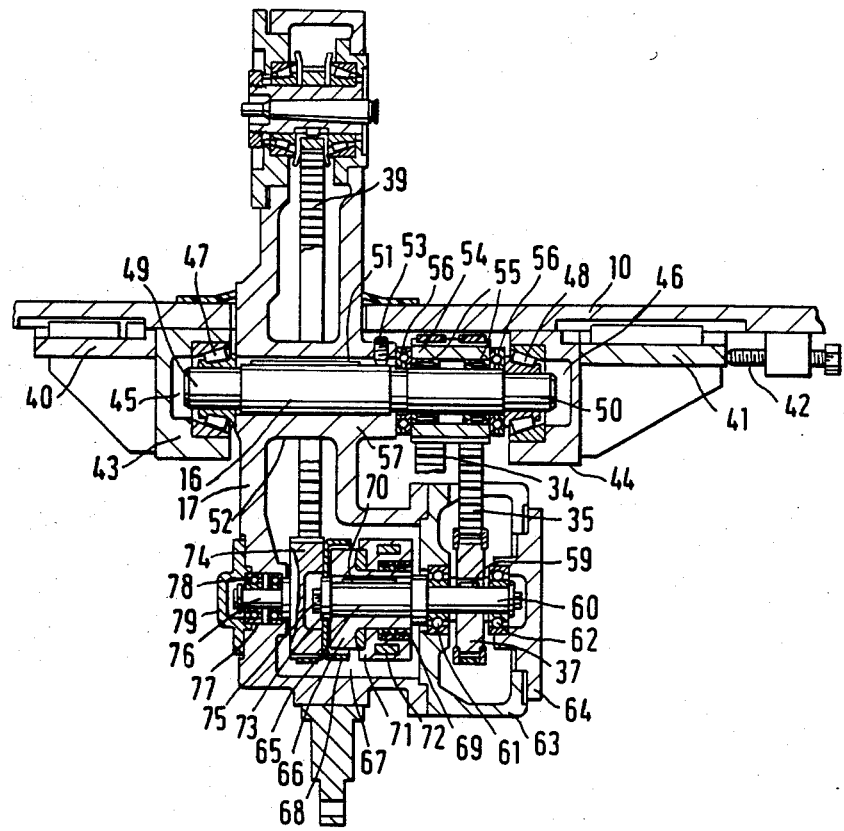
FIG. 2, a cross-section view along line II—II in FIG. 1.

The manner in which these individual gears work is explained in greater detail with regard to FIG. 2.

Below Table 10 there are provided supporting claws 40 and 41, which are located opposite each other. At least supporting claw 41 can be adjusted by means of an adjusting screw 42 to be guided in a movable manner in the direction of the axis of the swing axle 16. The support claws are guided on the table in known manner so that this guidance need not be described here in greater detail.

Each support claw has a bearing housing 43 or 44 with inside spaces 45 or 46, each having one slant-roller bearing 47 or 48, which provides bearing support for the swing axle 16. For this purpose the swing axle 16 has accurately measured bearing pins 49 and 50 enveloped by bearings 47 and 48.

In its left sector, swing axle 16 reaches through swing borehole 52 of swing housing 17 and is firmly connected in swing borehole 52 with housing 17 by means of slot and key joint 51. By means of a set screw 53, the position of the swing axle 16 is fixed in the borehole 52. In the right-hand sector, the swing axle has a bearing for supporting a tooth wheel 54 which includes a radial bearing 55 and, on both sides, an axial bearing 56. The left part of axial bearing 56 is supported against a pipe-shaped prolongation 57 which surrounds the borehole 52 whereas the right-hand axial bearing 56 abuts against the inside ring of bearing 48.

Toothed wheel 54 is enveloped by the toothed gear-belts 34 and 35.

Toothed gearbelt 35 envelopes toothed wheels 36 and 37 and, in FIG. 2, only toothed wheel 37 is seen. Toothed wheel 37 is firmly attached to a drive shaft 60 by a wedge joint 59, and shaft 60 is positioned by means of two bearings 61 and 62 in a housing 63 which is screwed against the lower segment of the swing housing 17. Housing 63, seen in FIG. 1, receives both toothed wheels 36 and 37. Toothed wheel 36 is firmly wedged here, likewise by means of a wedge joint, in the same manner, on a second drive shaft which is not illustrated in greater detail but which resembles drive shaft 60. Toward the outside, gear housing 63 is covered by lids 64 which simultaneously also serve to receive the bearings 62.

The drive shaft is continued toward the left and, with the left-hand segment 65, extends into the swing housing 17.

The left segment 65 of the drive shaft 60 is enveloped by armature 66 of an electromagnetic clutch 67. Armature 66 has a radially protruding flange 68 on which adjoins a pipe-shaped protrusion 69 by means of which the armature 66 is firmly wedged on the drive shaft 60 with the help of a wedge joint 70. A coil body 71 includes coil 72 which can move the armature in the direction of arrow C in such a manner that a clutch disc 73 is pressed against the right front surface of toothed wheel 74 so that, when the electromagnetic clutch 67 is engaged, armature 66 will drive wheel 74 and belt 39. Clutch disc 73 is attached, by a screw connection 75, to the left front surface of drive shaft 60. On toothed wheel 74 there is molded a bearing pin 76 which is positioned in a borehole 77 in housing 17 or in the left housing wall 17 by means of bearings 78; toothed wheel 74 is thus positioned in an overhung manner in the left housing wall of housing 17. The bearing is covered by a bearing lid 79.

A rotating device 18 or 19 is made to rotate by the toothed wheel 74 driving belt 39.

Figure 3:
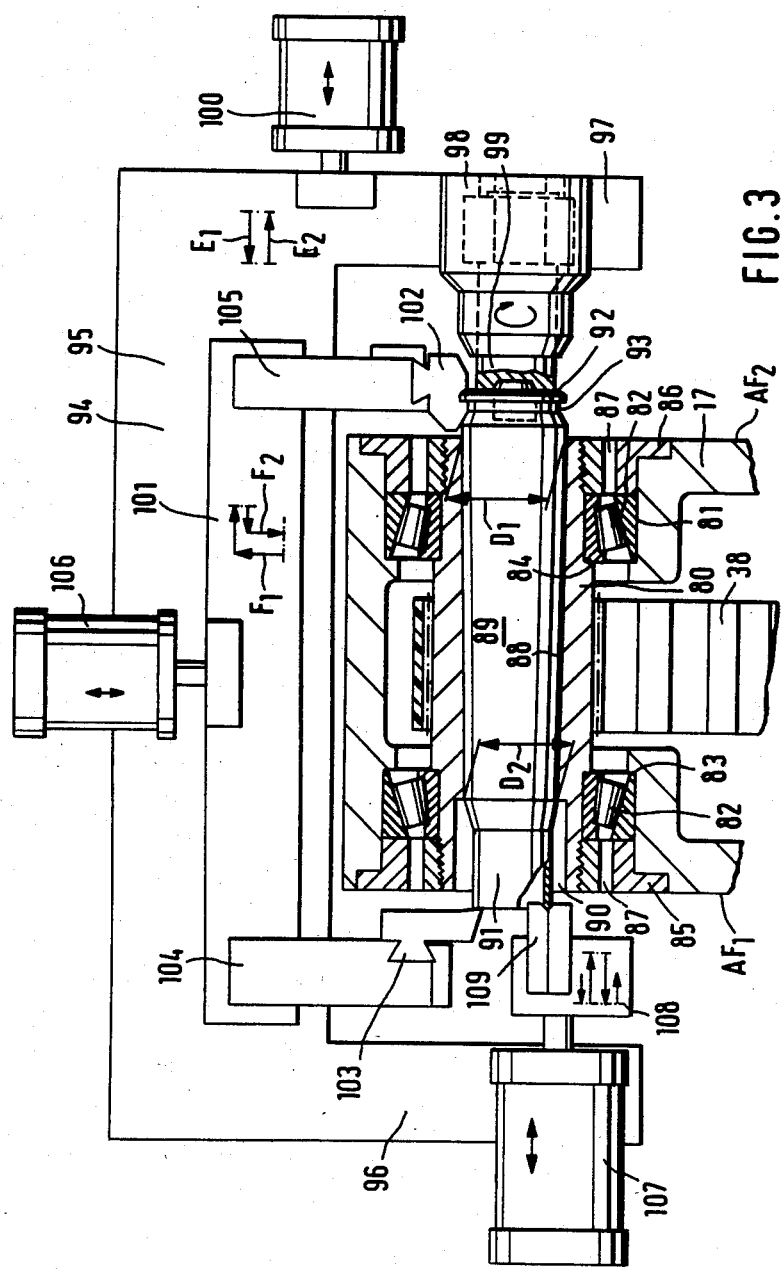
FIG. 3, a top view of the actual working mechanism, partly cut away.

Reference is made to FIG. 3 for the description of the work-piece holder.

FIG. 3 shows the upper segment of housing 17, as well as the belt 38 which extends around a rotating spindle 80 which is positioned in a borehole 81 in housing 17 by means of a bearing 82. The mounting of bearings 82 is accomplished in the known manner on a shoulder 84 on the rotating spindle 80 and by means of two bearing lids 85 and 86 which in each case are provided with a borehole 87 for lubrication. The rotating spindle 80 forms a conical cavity 88 in which work-piece 89, which has a conical outside shape and which is preferably a cartridge case, is received. The cavity 88 opens to the right so that the diameter D1 on the right side is greater than the diameter D2 on the left side. Adjoining the conical cavity 88, there is a step-wise widening 90 and, through this widening, the case neck 91 extends and on the left side protrudes over the outside surface $AF_1$. In a similar manner, cartridge case 89 on the right side protrudes beyond the outside surface $AF_2$ whereby the extraction flange 92 is formed with extraction groove 93. Cartridge case 89 is known in the art.

Outside and above housing 17 is a U-shaped main sled 94 having a cross-bar 95 and two shanks 96 and 97 running perpendicularly thereto. This main sled may be adjusted by feed cylinder 100 back and forth in the directions of arrows $E_1$ or $E_2$ which are in the direction of the axis of rotating spindle 80. Shank 97, which is on the right, carries a longitudinal stop 98 which follows along and by means of a plunger 99, is pressed upon the right front surface of the cartridge case when the main sled is moved to the left. In this process, casing 89 is completely pressed into the conical opening 88, in which it is held firmly because of friction and where it is placed in an exact rotational position.

In addition to the main sled 94, there is provided a cut-off sled 101 which can be shifted on the cross-bar 95 of the main sled in arrow directions F1 and F2. Cut-off sled 101, which is guided on cross-bar 95 in known manner by means of a precision guidance device, carries a first tool 102 and a second tool 103, whereby the first tool 102, that is, the right-hand cut-off steel piece, is made in the form of a rotating and puncturing steel piece and has, on its forward end, a shape which forms the extractor groove 93 and the extraction flange 92 on cartridge case 89.

Tool 103 is made in known manner with a tip and is held on cut-off steel pieceholder 104. Tool 102 is likewise attached to a holder 105, and both 104 and 105 are firmly attached to the cut-off sled 101. The spacing between tools 102 and 103 is so dimensioned that cartridge case 89 can be cut off or worked exactly to a predetermined precise length in a single operation moving the cut-off sled 101 in arrow direction F2 by a feed cylinder 106.

Additionally, on the left shank 96 of the main sled 94 is a feed cylinder 107 for a so-called deburring sled 108 which, after the cutting off of the cartridge case, is moved against the cartridge case edge from the left to the exact length as a result of which the left-hand cartridge case edge is shaped in accordance with the shape of the deburring steel piece 109. The deburring sled 108 and the feed cylinder 107 can also be attached in a fixed manner on the housing; they need not be attached to the main sled. This is practical because the activation path of deburring sled 108 will not become too long.

With the help of the design according to the invention, especially with the design of the drive mechanism, the magnetic clutch, and the arrangement of the swing housing, as well as with the actual working mechanisms for the cartridge case, the invention allows simple and fast working of cartridge cases. First of all, the swingability of housing 17 facilitates a short working time in that the charging of rotating spindles 80 and the removal of the finished cartridge cases can be accomplished rapidly and in a simple manner. Also, the working time of the cartridge case itself is clearly reduced especially by the simultaneous working of both case ends, e.g., the simultaneous shaping of extractor groove 93 and flange 92 and the adjustment of the cartridge case to a precise length. By virtue of the electromagnetic clutch 67 the invention ensures that only one rotating spindle with be in operation at a time so that the other rotating spindle can be loaded or unloaded. In this way, fewer rotating spindles are needed and, moreover, only the spindle actually being used is revolving. The timing intervals, therefore, are shorter because the swinging of the housing can be accomplished in a shorter time than the turning of a rotating table. The evacuation of chips is furthermore also better on the whole.

Switching the rotating spindles from the working station to the loading station (not illustrated in greater detail in the figures) is accomplished in a central fashion with a pneumatic cylinder which, together with the drive motor, sits in a basic frame to which table 10 is attached. The case is lined up and held firmly exclusively by means of adhesive friction over the cone of the case and, moreover, the cut-off sled or the main sled 94 is constantly above the so-called rotation station, that is to say, the work-piece holding device. As soon as the unprocessed case is located in the rotating spindle, sled 94 is moved in arrow direction $E_1$ by means of the pneumatic or hydraulic cylinder 100, so that plunger 99 will abut against the case. Thereafter, sled 101 is activated by means of cylinder 106, the cartridge case is simultaneously worked at both ends, and finally the deburring is also performed. After that, the individual cylinders 100, 106 and 107 are again returned into their initial positions, the swing housing is swung into the next position in which the next work-piece holding device sits in the correct position below the main sled and the processing phase is begun for the next cartridge case. At the same time, the finished cartridge case is forced out of the rotating spindle. Since only one rotating spindle is in operation during each work operation, the lifetime of the entire mechanism which, after all, depends essentially on the lifetime of the individual rotating spindles and the gears that drive the rotating spindles, is lengthened.

The invention has been described above with the help of an example. Of course, this is not intended to reduce the scope of protection for the invention.

What is claimed is:

1. Apparatus for manufacture of articles comprising a housing rotatably mounted on a shaft for rotation about an axis, at least two rotatable spindles mounted on said housing for rotation about respective axes, each of said spindles being adapted to hold one of said articles, and actuating means for controlling the rotational position of said housing about said shaft to locate a first of said spindles in a working position for one rotational position of said housing and a second of said spindles in said working position for another rotational position of said housing, wherein said actuating means comprises a piston-cylinder arrangement having one end pivotally attached to said housing and which positions said housing in discrete steps around said shaft.

2. Apparatus for manufacture of articles comprising a housing rotatably mounted on a shaft for rotation about an axis, at least two rotatable spindles mounted on said housing for rotation about respective axes, each of said spindles being adapted to hold one of said articles, and actuating means for controlling the rotational position of said housing about said shaft to locate a first of said spindles in a working position for one rotational position of said housing and a second of said spindles in said working position for another rotational position of said housing, a table means, a vertically extending column attached to said table means, and tool holding means mounted on said column, said tool holding means being vertically movable, wherein said shaft is arranged below said table and a portion of said housing extends through an opening in said table means, said portion of said housing receiving said rotating spindles and being positioned with respect to said column to allow each spindle to be selectively positioned in said working position, and stop means to limit the movement of said housing.

3. Apparatus for manufacture of articles comprising a housing rotatably mounted on a shaft for rotation about an axis, at least two rotatable spindles mounted on said housing for rotation about respective axes, each of said spindles being adapted to hold one of said articles, and actuating means for controlling the rotational position of said housing about said shaft to locate a first of said spindles in a working position for one rotational position of said housing and a second of said spindles in said working position for another rotational position of said housing, motor means for rotating first gear means on said shaft, and second gear means driven by said first gear means for selectively driving each of said spindles.

4. Apparatus according to claim 3 wherein said second gear means comprises at least two gear wheels, said apparatus further comprising first flexible belt means for transmitting rotational energy from each of said gear wheels to each of said spindles, and second flexible belt means for transmitting rotational energy from said first gear means to each of said gear wheels.

5. Apparatus according to claim 4 wherein said housing comprises a gear box for enclosing said second gear means.

6. Apparatus according to claim 4 wherein each of said gear wheels is rotationally mounted on a driving shaft and further comprising clutch means for selectively connecting each of said gear wheels to a respective said driving shaft.

7. Apparatus according to claim 6 wherein said clutch means is operated by electromagnetic means.

8. Apparatus according to claim 6 wherein said driving shaft rotates about an axis parallel to said axis of rotation of said housing.

9. Apparatus for manufacture of articles comprising a housing rotatably mounted on a shaft for rotation about an axis, at least two rotatable spindles mounted on said housing for rotation about respective axes, each of said spindles being adapted to hold one of said articles, and actuating means for controlling the rotational position of said housing about said shaft to locate a first of said spindles in a working position for one rotational position of said housing and a second of said spindles in said working position for another rotational position of said housing, table means, a vertically extending column attached to said table means, and tool holding means mounted on said column, said tool holding means being vertically movable, wherein said shaft is arranged below said table means and a portion of said housing extends through an opening in said table, said portion of said housing receiving said rotating spindles and being positioned with respect to said column to allow each spindle to be selectively positioned in said working position, said tool holding means further comprising a first sled having first tool means at one end of said first sled and second tool means at another end of said first sled, said first sled being mounted for movement toward and away from said working position.

10. Apparatus according to claim 9 further comprising a second sled mounted for movement in a direction parallel to said axes of rotation of said spindles and wherein said first sled is mounted on said second sled.

11. Apparatus according to claim 10 wherein said second sled includes first and second spaced shanks which are on opposite sides of one of said spindles and intersect an axis of rotation of said one of said spindles when said one of said spindles is in said working position, and further comprising longitudinal stop means on one of said shanks for engaging an end of an article, said longitudinal stop means being mounted to said one of said shanks for movement in said direction parallel to said axis of rotation of said spindles.

12. Apparatus according to claim 11 wherein each of said rotating spindles forms a conical cavity with a larger end of said cavity facing said longitudinal stop means, and wherein said article is a cartridge case with a conical shoulder which is caused to engage said cavity when said longitudinal stop means engages said cartridge case.

13. Apparatus according to claim 12 wherein said first tool comprises means to form an extractor groove and extractor flange on one end of said cartridge case and said second tool comprises means to cut another end of said cartridge case.

14. Apparatus according to claim 13 further comprising deburring means mounted on one of said shanks for deburring said another end of said cartridge case.

* * * * *